(12) United States Patent
Harris et al.

(10) Patent No.: US 6,812,278 B2
(45) Date of Patent: Nov. 2, 2004

(54) METHOD OF IMPROVING VISCOSITY STABILITY UPON ADDITION OF AN AQUEOUS TINTING COMPOSITION

(75) Inventors: Jerome Michael Harris, Penllyn, PA (US); Henry Jude Eichman, Havertown, PA (US); Homayoun Jamasbi, Blue Bell, PA (US); Dennis Paul Lorah, Lansdale, PA (US); John Michael Friel, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 219 days.

(21) Appl. No.: 10/025,707

(22) Filed: Dec. 26, 2001

(65) Prior Publication Data
US 2002/0161103 A1 Oct. 31, 2002

Related U.S. Application Data

(60) Provisional application No. 60/271,992, filed on Feb. 28, 2001, and provisional application No. 60/271,997, filed on Feb. 28, 2001.

(51) Int. Cl.[7] .............................. C08J 3/00; C08J 3/02; C08K 3/20; C08L 51/00
(52) U.S. Cl. ..................... 524/501; 523/305; 524/401; 524/502; 524/539
(58) Field of Search ..................... 523/305; 524/401, 524/501, 502, 539

(56) References Cited

U.S. PATENT DOCUMENTS

| | | |
|---|---|---|
| 4,243,430 A | 1/1981 | Sperry et al. |
| 5,168,105 A | 12/1992 | Anderson, Jr. et al. |
| 5,585,427 A | 12/1996 | Schimmel et al. |
| 5,821,283 A | 10/1998 | Hester et al. |
| 5,877,253 A | 3/1999 | Matta et al. |
| 6,008,303 A | 12/1999 | Weingart et al. |
| 6,080,209 A | 6/2000 | Wiesenfeldt et al. |
| 6,197,879 B1 | 3/2001 | Fischer et al. |
| 6,218,459 B1 | 4/2001 | Gruning et al. |
| 6,232,369 B1 | 5/2001 | Ma et al. |
| 6,313,260 B2 | 11/2001 | Gruning et al. |
| 2002/0019485 A1 | 2/2002 | Nakajima et al. |

FOREIGN PATENT DOCUMENTS

| | | |
|---|---|---|
| EP | 614950 A1 | 9/1994 |
| EP | 0747456 A2 | 12/1996 |
| EP | 974628 A2 | 1/2000 |
| WO | WO 00/22050 | 4/2000 |
| WO | WO0179348 | 10/2001 |

*Primary Examiner*—Patrick D. Niland
(74) *Attorney, Agent, or Firm*—Gary D. Greenblatt

(57) ABSTRACT

An aqueous tinting composition containing a pigment and a select dispersing resin is disclosed. In addition, a method of improving the viscosity stability of an aqueous coating composition upon the addition of the aqueous tinting composition containing a pigment and a select dispersing resin is disclosed.

10 Claims, No Drawings

METHOD OF IMPROVING VISCOSITY STABILITY UPON ADDITION OF AN AQUEOUS TINTING COMPOSITION

CROSS REFERENCE TO RELATED PATENT APPLICATIONS

This is a non-provisional application of prior pending U.S. provisional application Ser. No. 60/271,992 filed on Feb. 28, 2001 and prior pending U.S. provisional application Ser. No. 60/271,997 filed on Feb. 28, 2001.

This invention relates to an aqueous tinting composition containing a pigment and a select dispersing resin. The aqueous tinting composition is useful for tinting an aqueous base paint to prepare an aqueous coating composition. A method is also provided for improving the viscosity stability of an aqueous coating composition upon the addition of the aqueous tinting composition.

A classic problem in paints is a decrease in the paint viscosity, in particular, a decrease in mid-shear viscosity (Krebs-Stormer viscosity), when colorants that contain high levels of surfactant are added. This is especially problematic when the paint is tinted to a deep tone because a high level of surfactant generally accompanies the colorant. Besides surfactants, the colorants also contain other low molecular materials such as dispersants. The addition of colorants thus provides a source of low molecular weight materials to the paint base. The properties of coatings prepared from paints may be adversely affected by the presence of low molecular weight materials, for example, the films may become water sensitive.

Many paints are formulated with associative thickeners. Associative thickeners are water-soluble or water-swellable polymers that have chemically attached hydrophobic groups. The associative thickeners operate to thicken systems to which they are added by the non-specific associations, such as adsorption on surfaces and aggregation in solution akin to micellization, between the hydrophobic groups on the thickener molecules and moieties on the other components in the system, similar to the non-specific associations of conventional surfactants. Paints formulated with associative thickeners are especially sensitive to the problem of a decrease in viscosity upon the addition of colorants containing high levels of surfactant.

WO 00/22050 discloses an universal tinting concentrate containing an organic acid having no more than 70 carbon atoms. The disclosed tinting composition is suitable for water based paints. The addition of this tinting concentrate adds the organic acid having no more than 70 carbon atoms to the paint. This organic acid is a low molecular weight material and may adversely affect film properties.

Colorants are added to paints in units of milliliter of colorant per liter of paint (hereinafter referred to as "ml/liter") or ounces of colorant per gallon of paint (hereinafter referred to as "oz/gal"). Light-tint (pastel) paints typically contain no more than 31.2 ml/liter (4 oz/gal of colorant). Mid-tone paints typically contain from greater than 31.2 ml/liter (4 oz/gal of colorant) to 62.5 ml/liter (8 oz/gal) of colorant. Deep tone paints typically contain at least 62.5 ml/liter (8 oz/gal) of colorant.

Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost or both, particularly in deep tone paints.

Many conventional tinting machines employ twelve different colorants to mix the large palette of colors typically offered for most paint lines. Thus, it would be highly desirable to tailor the viscosity stability of an aqueous formulation based on the type and level of colorant component to be added, in particular, without the introduction of low molecular weight materials which may materially affect film properties. The compositions and methods of the present invention provide such a solution.

The first aspect of this invention provides a method of improving the viscosity stability of an aqueous coating composition upon the addition of an aqueous tinting composition, including the steps of: providing an aqueous base paint containing at least one polymer binder and at least one rheology modifier; and adding to the aqueous base paint, the aqueous tinting composition containing at least one pigment and at least one select dispersing resin having a Hansch parameter in the range of 2.1 to 6 and an acid number in the range of 65 to 150.

The second aspect of this invention provides an aqueous tinting composition containing from 2 to 70 weight % of at least one pigment, and from 0.1 to 40 weight % of at least one select dispersing resin having a Hansch parameter in the range of 2.1 to 6 and an acid number in the range of 65 to 150, based on the weight of the aqueous tinting composition.

As used herein, the term "(meth)acrylate" refers to either acrylate or methacrylate and the term "(meth)acrylic" refers to either acrylic or methacrylic.

As used herein, pigment volume concentration (referred to herein as "PVC") is a measure of how "binder-rich" a formulation is. It is calculated herein by the following formula:

$$PVC = 100\% \times \frac{(\text{volume of pigment(s)} + \text{volume of extender(s)})}{(\text{volume of pigment(s)} + \text{volume of extender(s)} + \text{volume of binder(s)})}$$

As used herein, volume solids content ("VS" herein) is the dry volume of pigment(s) plus the dry volume of extender(s) plus the dry volume of binder(s). It is calculated herein by the following formula:

$$VS = 100\% \times \frac{(\text{dry volume of pigment(s)} + \text{dry volume of extender(s)} + \text{dry volume of binder(s)})}{(\text{total volume of formulation})}$$

If additives are present, their volume is not included in determining the total dry volume.

As used herein, "KU" shall mean Krebs unit and is a measure of the mid-shear viscosity as measured by a Krebs-Stormer viscometer.

As used herein, "viscosity stability" shall mean the ability of a composition to resist change in viscosity as measured by KU upon the addition of surfactant or a composition containing surfactant. A preferred viscosity stabilizer for latex paints must provide KU viscosity changes of less than about 10 units upon the addition of up to 93.7 ml/liter (12 oz/gal) of colorant. A more preferred viscosity stabilizer for latex paints must provide KU viscosity changes of less than about 5 units upon the addition of up to 93.7 mi/liter (12 oz/gal) of colorant.

As used herein, a "volatile organic compound" (VOC) is defined herein as a carbon containing compound that has a boiling point below 280° C. at atmospheric pressure, compounds such as water and ammonia being excluded from VOCs. A volatile organic compound (VOC) may be added to an aqueous coating composition to improve the film properties or to aid in the application properties of the aqueous coating composition. Examples of such compounds include solvents and coalescents such as glycol ethers, organic esters, aromatic compounds, ethylene and propylene glycol, and aliphatic hydrocarbons.

The aqueous tinting composition of this invention contains at least one pigment and at least one select dispersing resin. The pigment is dispersed in the aqueous medium of the tinting composition.

The pigment is any organic or inorganic dry powder that imparts color to another substance or mixture. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toulidine red), quinacridone magenta, quinacridone violet, DNA orange, organic yellow pigment (such as Hansa yellow), and combinations thereof. Another type of pigment is a "metal effect agent", which imparts metallic-type luster and associated properties to final dry compositions. An example of a suitable metal effect agent includes mica having a titanium dioxide coating. The aqueous tinting composition may contain from 2 to 70 weight %, preferably at least 3 to 65 weight %, and more preferably, at least 4 to 63 weight % of at least one pigment, based on the weight of the aqueous tinting composition. The level of pigment in the aqueous tinting composition depends upon the pigment type.

The aqueous tinting composition also contains a select dispersing resin to disperse the pigment in the aqueous medium. The select dispersing resin is an addition polymer having acid groups. The select dispersing resin may be prepared by the polymerization of ethylenically unsaturated monomers. Suitable monomers to prepare the select dispersing resin include carboxylic acid monomers such as (meth) acrylic acid, itaconic acid, fumaric acid, and maleic acid; and comonomers such as include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1-C_{40}$ alkyl esters of (meth)acrylic acid; for example, methyl (meth) acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth) acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, trialkyl esters of ethylenically unsaturated di- and tri-carboxylic acids and anhydrides, such as ethyl maleate, dimethyl fumarate, trimethyl aconitate, and ethyl methyl itaconate. Preferred carboxylic acid monomers include (meth)acrylic acid. Preferred comonomers are butyl (meth) acrylate, styrene, and methyl methacrylate. The aqueous tinting composition may contain from 0.1 to 40 weight %, preferably at least 0.5 to 35 weight %, and more preferably, at least 0.75 to 30 weight % of at least one select dispersing resin, based on the weight of the aqueous tinting composition. The level of dispersing resin in the aqueous tinting composition depends upon the type of pigment and the level of pigment.

The select dispersing resin is characterized as having a hydrophobicity defined by a Hansch parameter in the range of 2.1 to 6, preferably in the range of 2.2 to 4, and more preferably in the range of 2.3 to 3.5. The Hansch parameter for a polymer is calculated using a group contribution method. The monomer units forming a polymer are assigned a hydrophobicity contribution and the relative hydrophobicities of the polymer is calculated based on the weight average of the monomers in the polymer. Hansch and Fujita, *J. Amer. Chem. Soc.*, 86, 1616–1626 (1964); H. Kubinyi, *Methods and Principles of Medicinal Chemistry*, Volume 1, R. Mannhold et al., Eds., VCH, Weinheim (1993); C. Hansch and A. Leo, *Substituent Constants for Correlation Analysis in Chemistry and Biology*, Wiley, N.Y. (1979); and C. Hansch, P. Maloney, T. Fujita, and R. Muir, *Nature*, 194. 178–180 (1962).

Values of the hydrophobicity contributions for several monomers are list in Table 1.

TABLE 1

| Monomer | Hydrophobicity Contribution |
|---|---|
| ethyl acrylate | 2.11 |
| butyl acrylate | 3.19 |
| 2-ethyl hexylacrylate | 5.22 |
| styrene | 4.29 |
| methyl methacrylate | 1.89 |
| ethyl methacrylate | 2.43 |
| butyl methacrylate | 3.51 |
| isobornyl methacrylate | 2.22 |
| butadiene | 4.0 |
| acrylic acid | −2.52 |
| methacrylic acid | −2.2 |
| maleic anhydride | −3.5 |

The acid number is the number of milligrams of KOH required to neutralize the acid contained in one gram of a material. The select dispersing resin may have an acid number in the 65 to 150, preferably in the range of 85 to 115, and more preferably in the range of 90 to 110.

The weight average molecular weight of the select dispersing resin may be in the range of 5,000 to 100,000, preferably in the range of 10,000 to 50,000, and more preferably in the range of 15,000 to 30,000. The weight average molecular weight is determined by methylation of the acid groups of the dispersing resin, followed by gel permeation chromatography using tetrahydrofuran as the solvent.

The polymerization techniques which may be used to prepare the select dispersing resin are well known in the art. The select dispersing resin may be prepared by emulsion polymerization and semibulk polymerization. The polymerization may be a redox or thermal initiation process employing conventional free radical initiators, such as, for example, ammonium and sodium persulfates, hydrogen peroxide, benzoyl peroxide, or t-butyl peroctoate at levels typically of from 0.05 to 3% by weight based on the total weight of monomer. Redox systems using the same initiators coupled with suitable reducing agents such as for example isoascorbic acid, sodium bisulphite, or sodium sulphoxylate formaldehyde may be used at similar levels. Surfactants may be included in the polymerization process. Suitable surfactants include nonionic and ionic surfactants. Chain transfer agents such as mercaptan, polymercaptan, and polyhalogen compounds in the polymerization mixture may be used to moderate the molecular weight of the select dispersing resin. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, trichlorobromoethane. Generally from 0.1 to 6 weight %, based on the weight of total monomer in the select dispersing resin, may be used. Alternatively, suitable molecular weights may be obtained by increasing the initiator level, or by a combination of increased initiator level and a chain transfer agent. The polymerization process may be a batch, semicontinuous, or continuous process.

The select dispersing resin may be provided as a solid or neutralized into aqueous solution. Suitable bases to neutralize the select dispersing resin include ammonium hydroxide, sodium hydroxide, potassium hydroxide, triethanol amine, and diethanol amine. Ammonium hydroxide is preferred.

The aqueous tinting composition contains at least 15 weight % water. Water miscible cosolvents such as ethylene glycol, propylene glycol, glycol ethers, isopropanol may be included. Preferably the aqueous tinting composition contains a total level of volatile organic compounds in the range of 0 to 10 weight %, preferably 0 to 6 weight %, and more preferably 0 to 4 weight %, based on the weight of the aqueous tinting composition. The pH of the aqueous tinting composition may be in the range of 7 to 10. The viscosity of the aqueous tinting composition is preferably in the range of 100 to 10,000 cps as measured by a Brookfield viscometer (Brookfield Engineering Co.) to allow easy handling and addition of the aqueous tinting composition to an aqueous base paint.

The aqueous tinting composition may optionally contain other ingredients including biocides; low molecular weight dispersants; extenders such talc and calcium carbonate; humectants such as hydroxyethyl cellulose and polysaccharides; thickeners; and surfactants. Preferably the type and level of surfactant does not adversely affect the thickening efficiency of associative thickeners in a material manner.

In one embodiment, the aqueous tinting composition is substantially free of surfactant and contains from 0 to 5 weight %, 0 to 3 weight %, and more preferably from 0 to 2 weight % surfactant, based on the weight of the aqueous tinting composition.

In one embodiment, the aqueous tinting composition is substantially free of low molecular weight dispersant and contains from 0 to 3 weight %, 0 to 1.5 weight %, and more preferably from 0 to 1 weight % dispersant, based on the weight of the aqueous tinting composition.

In another embodiment, the aqueous tinting composition is substantially free of low molecular weight dispersant and substantially free of surfactant.

The aqueous tinting composition may also contain a macromolecular organic compound having a hydrophobic cavity. These macromolecular compounds may complex with surfactant to diminish the viscosity lowering effect of the surfactant on the aqueous coating composition. Suitable macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to (α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative.

The cyclic oligosaccharides having a hydrophobic cavity, such as cycloinulohexose, cycloinuloheptose, useful in the composition and method of the invention are described by Takai et al., *Journal of Organic Chemistry*, 1994, volume 59, number 11, pages 2967–2975.

The calyxarenes useful in the aqueous tinting composition and method of the invention are described in U.S. Pat. No. 4,699,966, WO 89/08092; JP-A-88/197544 and JP-A-89/007837.

The cavitands useful in the aqueous tinting composition and method of the invention are described in Italian application 22522 A/89 and Moran et al., *Journal of the American Chemical Society*, volume 184, 1982, pages 5826–5828.

The non-cyclic polysaccharides useful in the aqueous tinting composition and method of the invention are described in PCT application WO 98/24821. Suitable non-cyclical polysaccharides include both unmodified polysaccharides and modified polysaccharides which are partially or totally derivatized on the hydroxyl groups.

The level of macromolecular organic compound having a hydrophobic cavity in the aqueous tinting composition may be in the range of 0 to 5 weight %, preferably from 1 to 4 weight %, and more preferably, from 2 to 3 weight %, based on the weight of the aqueous tinting composition.

The aqueous tinting composition may be prepared by providing the select dispersing resin in a neutralized into water. Base may be added to the water prior to, during, or after the addition of the dispersing resin. Next, the pigment is dispersed into the water containing the neutralized select dispersing resin. High shear mixing may be employed to disperse the pigment. The pH of the aqueous tinting composition is typically in the range of 7 to 10.

The aqueous tinting composition of this invention may be added to an aqueous base paint to prepare an aqueous coating composition. The aqueous tinting composition is added to change the color of the aqueous base paint, or to modify the color or the appearance of a coating prepared from the aqueous coating composition. The aqueous base paint contains polymer binder and rheology modifier. The aqueous base paint may be a neutral base paint useful for preparing deep tone-coatings. The neutral base paint does not contain titanium dioxide or other materials which provide opacity. The aqueous base paint may also be a white base paint useful for preparing opaque coatings. The white base paint contains titanium dioxide. The titanium dioxide is contained in the white base paint as particles. The titanium dioxide particles typically have an average diameter in the range of 80 nm to 250 nm and may have a coating of silica or a coating of alumina. Suitable forms of titanium dioxide include rutile titanium dioxide and anatase titanium dioxide. The white base paint may contain titanium dioxide at a level of 58 g/liter to 2034 g/liter (10 lbs/100 gal to 350 lbs/100 gal) of aqueous base paint.

The aqueous base paint also contains a polymer binder. The polymer binder is dispersed as polymer particles in the aqueous medium of the aqueous base paint and may have average particle diameters in the range of 20 nm to 1000 nm. Suitable polymer binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate copolymers, styrene/butadiene copolymers polyester polymer, polyethers and the like, and mixtures thereof. The polymer binder may be provided as an aqueous dispersion such as an emulsion polymer. The polymer binder may be chosen to provide a coating, which is prepared from the aqueous coating composition, with properties such as adhesion to a substrate, gloss, abrasion resistance, and barrier properties such as moisture resistance and solvent resistance. The level of binder in the aqueous base paint may be in the range of 145 g/liter to 2034 g/liter (25 dry lbs/100 gal to 350 dry lbs/100 gal) of the aqueous base paint.

The aqueous base paint also contain at least one rheology modifier to thicken the aqueous base paint and to modify the rheology to allow application on substrates without excessive splattering or dripping of the aqueous coating composition, or sag of the wet paint film. Typically more than one rheology modifier is added to a paint to provide an aqueous paint with the desired rheology. Suitable rheology modifiers include nonhydrophobically modified rheology modifiers such as hydroxyethyl cellulose (HEC), alkali soluble emulsions (ASE), and polyvinyl alcohol; and hydrophobically modified rheology modifiers, also referred to as associative thickeners, such as hydrophobically modified ethylene oxide urethane block copolymers (referred to herein as "HEUR"), hydrophobically modified alkali soluble polymers including hydrophobically modified alkali soluble emulsions (referred to herein as "HASE"), hydrophobically-modified celullosics, including hydrophobically-modified hydroxyethyl cellulose (referred to herein as "HMHEC"), hydrophobically modified poly(acrylamide); and mixtures thereof. The rheology modifier may be present at a level of 5.8 g/liter to 116 g/liter (1 lb/100 gal to 20 lb/100 gal) of the aqueous base paint. A preferred aqueous base paint contains at least one associative thickener, which may be present in the aqueous base paint at a level of at least 0.05% by weight of solids, based on the weight of the aqueous base paint.

In one embodiment, the aqueous base paint is a low VOC composition containing from 0 to less than 6% VOC by weight, preferably from 0 to less than to 3% VOC, and more preferably from 0 to less than 2% VOC, based on the total weight of the aqueous base paint. An aqueous coating composition containing from 0 to less than 6% VOC by weight, preferably from 0 to less than to 3% VOC, and more preferably from 0 to less than 2% VOC, based on the total weight of the aqueous coating composition, may be prepared from an aqueous base paint having a low VOC composition.

The method of this invention includes the step of adding the aqueous tinting composition of this invention to an aqueous base paint to prepare an aqueous coating composition. This step is easily achieved by the addition of the aqueous tinting composition with mixing.

The aqueous tinting composition and the method of this invention are useful for improving the viscosity stability of an aqueous coating composition, particularly upon the addition of the aqueous tinting composition to an aqueous base paint containing at least one associative thickener. The composition and method of the invention are not limited by the type of pigment that is added to the aqueous coating composition.

The water-resistance properties, including blister resistance, wet adhesion, and scrub resistance of the compositions prepared using the aqueous tinting composition and method of this invention, are expected to be improved because of the use of lower amounts of low molecular weight materials such as surfactants and dispersants, which may be used relative to conventional formulating techniques. Further, aqueous coating compositions prepared using the aqueous tinting compositions and the method of this invention, may react more predictably to added aqueous tinting compositions, making color matching easier and facilitating the use of software for color matching. Also, viscosity fluctuation in the aqueous coating composition is expected to be reduced. Further, the freeze-thaw stability of the aqueous coating composition, the dispensing of the aqueous tinting composition (no clogs) and the sag resistance properties of wet films prepared from aqueous coating compositions using the aqueous tinting compositions and method of the invention are expected to be improved.

The aqueous coating composition may be free of organic solvent or it may contain a coalescing solvent. The aqueous coating composition may contain typical coating additives such as fillers, defoamers, cross-linkers, catalysts, surfactants, stabilizers, anti-flocculants, coalescents, waxes, antioxidants, and suitable solvents, such as water miscible solvents.

The aqueous coating composition of this invention may be applied by methods well known in the art such as air-assisted spray, airless spray, plural component spray, brush, roller squeegee, roll coater, curtain coater, and the like. Substrates to which the aqueous coating composition may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; and leather. The aqueous coating composition may be used, for example, as a wood coating, maintenance coating, interior or exterior wall coating, metal primer or coating, plastics coating, traffic paint, leather coating, coil coating, architectural coating. Coatings prepared from the aqueous coating composition may be flat coatings, satin coatings, semi-gloss coatings, gloss coatings, primer, textured coatings, and the like.

The aqueous tinting composition and method of the present invention are particularly useful in systems employing delayed product differentiation, including tinting and mixing of the product components at the point-of-manufacture, point-of-sale or point-of-use, such as those disclosed in U.S. Provisional Applications Serial No. 60/183,655 filed Feb. 18, 2000, No. 60/183,656 filed Feb. 18, 2000, and No. 60/247,639 filed Nov. 10, 2000.

All ranges used herein are inclusive and combinable. Some embodiments of the present invention will now be described in detail in the following Examples.

The Krebs-Stormer viscosity was measured using ASTM method D562.

EXAMPLE 1

Preparation of Aqueous Tinting Compositions

Aqueous tinting composition were prepared containing the select dispersing resins. The select dispersing resins were styrenated acrylic copolymers with the properties listed in Table 1.1

TABLE 1.1

Select Dispersing Resins

| Select Dispersing Resin | Hansch Parameter | Acid Number | Weight Average Molecular Weight |
|---|---|---|---|
| Example 1.1 | 2.17 | 98 | 20,000 |
| Example 1.2 | 2.81 | 98 | 20,000 |
| Example 1.3 | 3.33 | 98 | 20,000 |

The select dispersing resins in Table 1.1 were provided as aqueous solutions.

Green tinting compositions were prepared containing the materials listed in Table 1.2. The green aqueous tinting composition, Example G1, was prepared using the select dispersing resin Example 1.1.

TABLE 1.2

Preparation of Green Tinting Compositions

| Material | Example G1 (wt. %) | Comparative G (wt. %) |
|---|---|---|
| diethylene glycol | 22.91 | 23.00 |
| Water | 12.55 | 19.5 |
| defoamer | 2.99 | 3.00 |
| surfactant-1 | 0 | 3.50 |
| surfactant-2 | 3.98 | 4.00 |
| dispersant | 1.49 | 1.5 |
| extender-1 | 9.96 | 9.96 |
| extender-2 | 24.90 | 24.90 |
| phthalo green pigment | 9.96 | 9.96 |
| ammonia (28%) | 0.69 | 0.68 |
| Water | 1.06 | 0 |
| Example 1.1 (40.7 wt %) | 9.5 | 0 |

Green aqueous tinting compositions Example G2 and Example G3 were prepared with dispersing resins Example 1.2 and Example 1.3, respectively, replacing select dispersing resin Example 1.1 in the Example G1.

Yellow tinting compositions were prepared containing the materials listed in Table 1.3. The yellow aqueous tinting composition, Example Y1, was prepared using the select dispersing resin Example 1.1.

TABLE 1.3

Preparation of Yellow Tinting Compositions

| Material | Example Y1 (wt. %) | Comparative Y (wt. %) |
|---|---|---|
| glycol mixture | 14.2 | 29.00 |
| Water | 16.20 | 11.40 |
| defoamer | 2.00 | 2.00 |
| surfactant | 0 | 8.00 |
| dispersant | 1.5 | 2.0 |
| Yellow iron oxide pigment | 49.10 | 49.10 |
| ammonia (28%) | 0.50 | 0.50 |
| Example 1.1 | 16.60 | 0 |

Yellow aqueous tinting compositions Example Y2 and Example Y3 were prepared with dispersing resins Example 1.2 and Example 1.3, respectively, replacing select dispersing resin Example 1.1 in Example Y1.

EXAMPLE 2
Preparation of Aqueous Base Paint

An aqueous base paint was prepared by first preparing a titanium dioxide grind by combining the materials in the order listed in Table 2.1.

TABLE 2.1

Titanium Dioxide Grind

| Material | Amount |
|---|---|
| Water | 53.11 g |
| propylene glycol | 1.70 g |
| Tamol ™ 731 dispersant | 1.00 g |
| Triton ™ CR-10 surfactant | 0.07 g |
| Foamaster ™ VL defoamer | 0.10 g |
| Kathon ™ LX (1.5%) | 0.07 g |
| Rhoplex ™ SG-10M polymer binder | 200.00 g |
| Ti-Pure ™ R-706 titanium dioxide | 25.00 g |
| Acrysol ™ RM-2020 NPR rheology modifier | 10.00 g |
| Water | 50.00 g |

Kathon, Rhoplex, and Acrysol are trademarks of Rohm and Haas Company.

Foamaster is a trademark of Cognis Corp.
Triton is a trademark of the Union Carbide Co.
Ti-Pure is a trademark of E.I. DuPont de Nemours and Co.

Next, an aqueous base paint was prepared by combining the titanium dioxide grind with the materials listed in Table 2.2.

TABLE 2.2

Aqueous Base Paint Formulation

| Material | Amount |
|---|---|
| Water | 62.78 g |
| Rhoplex ™ SG-10M polymer binder | 403.13 g |
| Ropaque ™ Ultra plastic pigment | 5.60 g |
| Texanol ™ coalescent | 30.33 g |
| ammonia (28%) | 1.43 g |
| Acrysol ™ RM-2020 NPR rheology modifier | 14.24 g |
| Acrysol ™ RM-825 rheology modifier | 0.65 g |
| Foamaster ™ VF defoamer | 2.00 g |
| water | 25.00 g |

Ropaque is a trademark of Rohm and Haas Company.

Texanol is a trademark of Eastman Chemical Co.
The aqueous base paint had a PVC of 3.3% and a VS of 33.8%.

EXAMPLE 3
Preparation of Aqueous Coating Compositions

The aqueous coating compositions were prepared by mixing the aqueous tinting compositions into the aqueous base paint at a level of 93.7 ml/liter (12 oz/gal). The Krebs-Stormer viscosity of the aqueous coating compositions were measured prior to and 24 hours after the addition of the aqueous tinting compositions.

TABLE 3.1

Viscosity Decrease for Aqueous Coating Composition Containing Aqueous Tinting Composition

| Coating Composition | Tinting Composition | Viscosity Change (KU) |
|---|---|---|
| Example 3.1 | Example G1 | −13 |
| Example 3.2 | Example G2 | −3.4 |
| Example 3.3 | Example G3 | −5.9 |
| Comparative 3.A | Comparative G | −21.4 |
| Example 3.4 | Example Y1 | −17 |
| Example 3.5 | Example Y2 | −6.9 |

TABLE 3.1-continued

Viscosity Decrease for Aqueous Coating Composition Containing Aqueous Tinting Composition

| Coating Composition | Tinting Composition | Viscosity Change (KU) |
|---|---|---|
| Example 3.6 | Example Y3 | −6.3 |
| Comparative 3.B | Comparative Y | −50.7 |

The results in Table 3.1 show that the addition of the aqueous tinting compositions of this invention, which contained the select dispersing resins, improved the viscosity stability of the aqueous coating compositions. In particular, the aqueous coating compositions containing the green aqueous tinting compositions of this invention, Examples 3.1–3.3, had viscosity decreases of 13 KU or less. In comparison, the comparative coating composition, Comparative 3.A, which was tinted with a surfactant containing tinting composition, had a viscosity decrease of 21.4 KU. For the aqueous coating compositions containing the yellow aqueous tinting compositions of this invention, Examples 3.4–3.6, the viscosity decreases were 17 KU or less. The comparative coating composition, Comparative 3.B, had a viscosity decrease of 50.7 KU.

The results show that the aqueous tinting composition containing the select dispersing resins and the method of preparing the aqueous coating compositions of this invention provide aqueous coating composition with improved viscosity stability.

We claim:

1. A method of improving the viscosity stability of an aqueous coating composition upon the addition of an aqueous tinting composition, comprising the steps of:
   a) providing an aqueous base paint comprising:
      i) at least one polymer binder,
      iii) at least one rheology modifier; and
   b) adding to said aqueous base paint, said aqueous tinting composition comprising:
      i) at least one pigment; and
      ii) at least one select dispersing resin having a Hansch parameter in the range of 2.1 to 6 and an acid number in the range of 65 to 150.

2. The method according to claim 1 wherein said select dispersing resin has a weight average molecular weight in the range of 15,000 to 40,000.

3. The method according to claim 1 wherein said select dispersing resin is prepared by emulsion polymerization.

4. The method according to claim 1 wherein said rheology modifier is an associative thickener.

5. The method according to claim 1, 2, 3 or 4 wherein said aqueous tinting composition further comprises at least one macromolecular compound having a hydrophobic cavity.

6. The method according to claim 1, 2, or 3 wherein said aqueous tinting composition comprises from 0 to 5 weight % surfactant.

7. An aqueous tinting composition comprising:
   a) from 2 to 70 weight % of at least one pigment; and
   b) from 0.1 to 40 weight % of at least one select dispersing resin having a Hansch parameter in the range of 2.1 to 6 and an acid number in the range of 65 to 150; based on the weight of said aqueous tinting composition.

8. The aqueous tinting composition according to claim 7 wherein said select dispersing resin has a weight average molecular weight in the range of 15,000 to 40,000.

9. The aqueous tinting composition according to claim 7 wherein said select dispersing resin is prepared by emulsion polymerization.

10. The aqueous tinting composition according to claim 7, 8, or 9 comprising a total level of volatile organic compounds in the range of 0 to 10 weight %, based on the weight of said aqueous tinting composition.

* * * * *